(12) United States Patent
Liao et al.

(10) Patent No.: US 11,001,701 B2
(45) Date of Patent: May 11, 2021

(54) PVC PRODUCT AND STABILIZING AGENT THEREOF

(71) Applicant: NAN YA PLASTICS CORPORATION, Taipei (TW)

(72) Inventors: Te-Chao Liao, Taipei (TW); Jung-Jen Chuang, Taipei (TW); Zhi-Ming Huang, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 0 days.

(21) Appl. No.: 16/597,906

(22) Filed: Oct. 10, 2019

(65) Prior Publication Data

US 2020/0148858 A1    May 14, 2020

(30) Foreign Application Priority Data

Nov. 12, 2018   (TW) ................. 107140102

(51) Int. Cl.
| | |
|---|---|
| *C08K 13/02* | (2006.01) |
| *C08K 3/24* | (2006.01) |
| *C08K 3/34* | (2006.01) |
| *C08L 27/06* | (2006.01) |
| *C08K 5/17* | (2006.01) |
| *C08K 5/20* | (2006.01) |

(52) U.S. Cl.
CPC ............... *C08K 13/02* (2013.01); *C08K 3/24* (2013.01); *C08K 3/34* (2013.01); *C08K 5/17* (2013.01); *C08K 5/20* (2013.01); *C08K 2003/343* (2013.01)

(58) Field of Classification Search
CPC .............. C08K 5/17; C08K 5/20; C08L 27/06
See application file for complete search history.

(56) References Cited

U.S. PATENT DOCUMENTS

| 6,348,517 B1 | 2/2002 | Wang et al. | |
|---|---|---|---|
| 2004/0054043 A1* | 3/2004 | Friedrich ............... | C08L 27/04 524/244 |
| 2012/0208941 A1 | 8/2012 | Reith | |

FOREIGN PATENT DOCUMENTS

| CN | 101248128 A | 8/2008 |
|---|---|---|
| FR | 1211814 A | 3/1960 |
| GB | 1151108 A | 5/1969 |
| JP | S619451 A | 1/1986 |
| WO | 2006136191 A1 | 12/2006 |

\* cited by examiner

*Primary Examiner* — Vu A Nguyen
(74) *Attorney, Agent, or Firm* — Li & Cai Intellectual Property (USA) Office

(57) ABSTRACT

A PVC product and a stabilizing agent thereof are provided. The stabilizing agent is composed of perchlorate, alkanolamine, and alkanolamide. The total amount of alkanolamine and alkanolamide in the stabilizing agent is 80-99 wt % of the total weight of the stabilizing agent, and the weight ratio of the total amount of alkanolamine and alkanolamide to the amount of perchlorate is 4:1 to 99:1, so that the PVC product has a lower Yellowness Index (YI) and higher transparency.

8 Claims, No Drawings

PVC PRODUCT AND STABILIZING AGENT THEREOF

CROSS-REFERENCE TO RELATED PATENT APPLICATION

This application claims the benefit of priority to Taiwan Patent Application No. 107140102, filed on Nov. 12, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a PVC product and a stabilizing agent thereof, and in particular, to a PVC product and a stabilizing agent thereof composed of perchlorate, and alkanolamine, and alkanolamide.

BACKGROUND OF THE DISCLOSURE

With the special structure of PVC, when being processed under high temperature and high shear conditions, HCL on molecules of PVC is easy to be removed, resulting in thermal degradation of a PVC polymer, color change in the PVC product (i.e., the color becomes yellow), and reduced mechanical properties of the product, thus affecting the service life. Therefore, a heat stabilizer such as a lead salt type heat stabilizer is required to be added so as to increase stability of PVC.

However, with the increasing environmental awareness in the world and efforts to reduce the heavy metal content of PVC, lead salt type heat stabilizers are gradually replaced by non-toxic stabilizer products.

For example, U.S. Pat. No. 6,348,517B1 teaches the combined use of polyethylene glycol, polypropylene glycol and esters thereof such as adipate and dibenzoate and ethers thereof, mixed with calcium/zinc fatty acid salts, as a PVC stabilizer.

British Publication No. GB1151108(A) teaches the use of dipropyleneglycol and other high-boiling polyhydroxy compounds, such as pentaerythritol and dipentaerythritol for light stabilization of PVC.

French Publication No. FR1211814(A) teaches the use of glycerol or propylene glycol and calcium stearate or Na2CO3 as a PVC stabilizer.

Japanese Patent Publication No. JPS619451A teaches the use of specific ammonium perchlorate to prevent discoloration of a chlorine-containing resin.

U.S. Publication No. 2004054043 teaches the use of perchlorate and alkanolamine as a stabilizer of PVC, but when the stabilizer is applied to PVC products, the Yellowness Index (YI) of PVC products other than a PVC leather is still high.

More specifically, it has not been taught that conventional stabilizers for halogen-containing polymers use perchlorate, alkanolamine, and alkanolamide as a heat stabilizer.

SUMMARY OF THE DISCLOSURE

In view of the above, the present disclosure discloses a stabilizing agent, which is a mixture of at least one perchlorate (particularly alkali metal or alkaline-earth metal perchlorate), at least one alkanolamine of formula (I), and at least one alkanolamide of formula (II), and which is especially suitable for stabilizing chlorine-containing polymers, particularly PVC.

The stabilizing agent of the present disclosure includes the following components in the following amounts based on the total weight of the stabilizing agent, the sum of the amounts of the components is 100 wt %:
a) 1-20 wt % (weight percentage) of perchlorate with the molecular formula of $M(ClO_4)_n$, wherein M is lithium (Li), sodium (Na), potassium (K), magnesium (Mg), calcium (Ca), cesium (Sr), barium (Ba), zinc (Zn), aluminum (Al), lanthanum (La), cerium (Ce), or a hydrotalcite layer-lattice cation; n is 1, 2, or 3, depending on the valence of M; and when M is a hydrotalcite layer-lattice cation, 0<n<1;
b) 30-98 wt % of alkanolamine; and
c) 1-50 wt % of alkanolamide;
the alkanolamine is alkanolamine of the following formula (I),

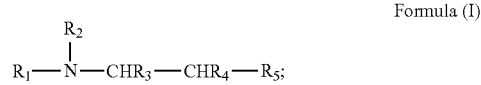

Formula (I)

the alkanolamide is alkanolamide of the following formula (II),

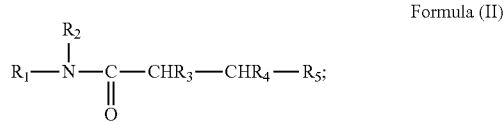

Formula (II)

wherein $R_1$ or $R_2$ is H, $C_1$-$C_{22}$ alkyl, $C_2$-$C_{22}$ alkenyl, $C_2$-$C_{22}$ ether, $C_2$-$C_{22}$ ester, $C_2$-$C_{22}$ acylamino, $C_2$-$C_{22}$ hydroxyl, $C_4$-$C_8$ cycloalkyl (which may be substituted with OH at β position), $C_6$-$C_{10}$ aryl, or $C_7$-$C_{10}$ alkaryl; $R_3$ or $R_4$ is H, $C_1$-$C_{22}$ alkyl, $C_2$-$C_1$ alkenyl, $C_6$-$C_{10}$ aryl, or $CH_2$—X—$R_6$ wherein X is O, S, —O—CO—, or —COO—; $R_5$ is H or OH; and $R_6$ is H, $C_1$-$C_{22}$ alkyl, $C_2$-$C_{22}$ alkenyl, or of $C_6$-$C_{10}$ aryl.

Preferably, a preferred example of the perchlorate is zeolite, $NaClO_4$ or $KClO_4$.

Preferably, in the stabilizing agent, a weight ratio of the total amount of alkanolamine of formula (I) and alkanolamide of formula (II) to the perchlorate is 4:1 to 99:1.

Preferably, when the stabilizing agent is added to a chlorine-containing polymer, the total amount of alkanolamine of formula (I) and alkanolamide of formula (II) in the stabilizing agent is 0.01-10 parts by weight, preferably 0.05-5 parts by weight, based on 100 parts by weight of PVC.

The present disclosure discloses a PVC product, prepared by adding the stabilizing agent of the present disclosure. Preferably, the PVC product is a PVC pipe, a PVC sheet, or a PVC leather.

The beneficial effect of the stabilizing agent of the present disclosure is that the PVC product is made to have a lower YI and a higher transparency, and the odor of the PVC leather is especially reduced.

These and other aspects of the present disclosure will become apparent from the following description of the embodiment taken in conjunction with the following drawings and their captions, although variations and modifications therein may be affected without departing from the spirit and scope of the novel concepts of the disclosure.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

A stabilizer (or stabilizing agent) of the present disclosure is suitable for use in stabilizing chlorine-containing polymers, particularly PVC, and especially reducing the odor of a PVC leather.

The stabilizing agent of the present disclosure is a mixture of the following components in the following amounts based on the total weight of the stabilizing agent, and the sum of the amounts of the components is 100 wt %:
a) 1-20 wt % of perchlorate;
b) 30-98 wt % of alkanolamine; and
c) 1-50 wt % of alkanolamide.

In the stabilizing agent of the present disclosure, the alkanolamine and the alkanolamide are essential components, and the total amount of the alkanolamine and the alkanolamide in the stabilizing agent is 80-99 wt % of the total weight of the stabilizing agent, and a weight ratio of the total amount of alkanolamine and alkanolamide to the amount of perchlorate is 4:1 to 99:1.

If the total amount of alkanolamine and alkanolamide in the stabilizing agent exceeds 99 wt % of the total weight of the stabilizing agent or is less than 80 wt % of the total weight of the stabilizing agent, when the stabilizing agent is used for stabilizing the chlorine-containing polymer, the YI of the PVC product is still high, and the deodorizing effect on the PVC leather is poor.

In the stabilizing agent of the present disclosure, alkanolamine is excluded and only the combination of perchlorate and alkanolamide is used as a stabilizer for PVC. When the stabilizing agent is used for stabilizing the chlorine-containing polymer, the YI of the PVC product is still high, and the deodorizing effect on the PVC leather is poor.

The molecular formula of the perchlorate is $M(ClO_4)n$, wherein M is Li, Na, K, Mg, Ca, Sr, Ba, Zn, Al, La, Ce, or a hydrotalcite layer-lattice cation, preferably Na or K. n is 1, 2, or 3, depending on the valence of M, or in the case that M is a hydrotalcite layer-lattice cation, $0<n<1$.

A common form of these perchlorates may be a solution form, such as a solution of perchlorate in water or an organic solvent; or in a form where it is absorbed onto a carrier, e.g., PVC, calcium silicate, zeolite or hydrotalcite; or perchlorate that is complexed or dissolved with alcohols (polyalcohols, dextrin) or with ether alcohols or ester alcohols or crown ethers. The alkanolamine is alkanolamine of the following formula (I),

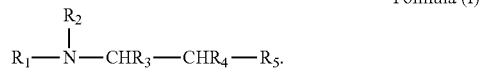

Formula (I)

The alkanolamide is alkanolamide of the following formula (II),

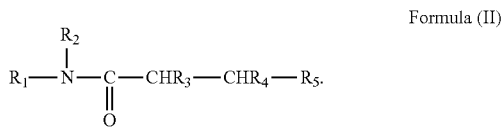

Formula (II)

In the formulas, $R_1$ or $R_2$ is H, $C_1$-$C_{22}$ alkyl, $C_2$-$C_{22}$ alkenyl, $C_2$-$C_{22}$ ether, $C_2$-$C_{22}$ ester, $C_2$-$C_{22}$ acylamino, $C_2$-$C_{22}$ hydroxyl, $C_4$-$C_8$ cycloalkyl (which may be substituted with OH at β position), $C_6$-$C_{10}$ aryl, or $C_7$-$C_{10}$ alkaryl; $R_3$ or $R_4$ is H, $C_1$-$C_{22}$ alkyl, alkenyl with C number greater than 2 (e.g., $C_2$-$C_{22}$), $C_6$-$C_{10}$ aryl, or $CH_2$—X—$R_6$ wherein X is O, S, —O—CO—, or —COO—; $R_5$ is H or OH; and $R_6$ is H, $C_1$-$C_{22}$ alkyl, $C_2$-$C_{22}$ alkenyl, or $C_6$-$C_{10}$ aryl.

The alkanolamine of formula (I) and the alkanolamide of formula (II) are commercially available chemicals or can be obtained through N-alkylation of corresponding amine or ammonia by a known method.

Preferably, the alkanolamine of formula (I) may be selected from one of alkanolamines listed in Table 1.

TABLE 1

| Alkanolamines | |
|---|---|
| Alkanol-amine | Structure |
| 1 | ![structure 1] |
| 2 | ![structure 2] |
| 3 | ![structure 3] |

TABLE 1-continued

Alkanolamines

| Alkanolamine | Structure |
|---|---|
| 4 | 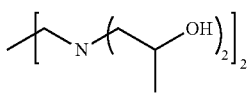 |
| 5 | 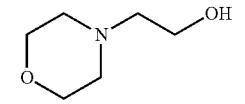 |
| 6 | 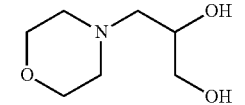 [SMILES: OCC(O)CN1CCOCC1] |
| 7 | 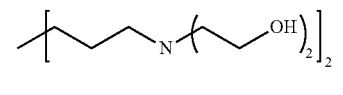 |
| 8 | 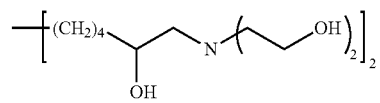 |
| 9 | 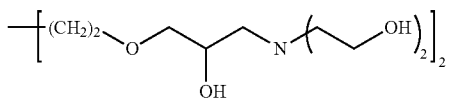 |
| 10 | 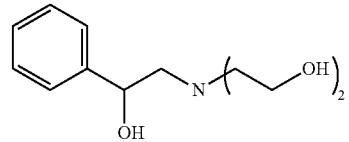 |
| 11 | 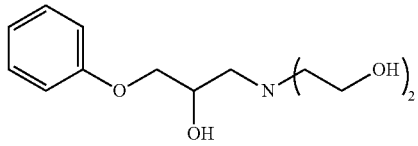 |
| 12 | 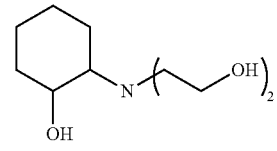 |
| 13 | 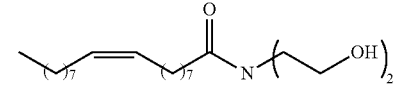 |
| 14 | 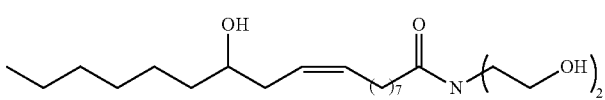 |
| 15 | $^nC_{14}H_{29}$ — structure |
| 16 | $^nC_{12}H_{25}$ — structure |
| 17 | $^nC_4H_9CH(C_2H_5)$ — structure |
| 18 | $(CH_2)_4$ — structure |
| 19 | $(CH_2)_2$ — structure |
| 20 | phenyl structure |
| 21 | phenoxy structure |
| 22 | cyclohexyl structure |

Preferably, the alkanolamide of formula (II) may be selected from one of alkanolamides listed in Table 2.

TABLE 2

Alkanolamides

| Alkanolamide | Structure |
|---|---|
| 1 | structure |
| 2 | structure |

TABLE 2-continued

Alkanolamides

| Alkanolamide | Structure |
|---|---|
| 3 | (structure: abietic acid-derived diethanolamide) |
| 4 | (structure: α-methylcinnamoyl diethanolamide) |
| 5 | (structure: linoleoyl diethanolamide) |
| 6 | (structure: oleoyl diisopropanolamide) |
| 7 | (structure: oleoyl bis(2,3-dihydroxypropyl)amide variant) |
| 8 | (structure: 2-naphthyl enone-keto amide diethanolamide) |

When the stabilizing agent of the present disclosure is used as a stabilizing agent for chlorine-containing polymers, the total amount of alkanolamine of formula (I) and alkanolamide of formula (II) in the stabilizing agent is 0.01-10 parts by weight, preferably 0.05-5 parts by weight, based on 100 parts by weight of PVC.

When the stabilizing agent of the present disclosure is used as a stabilizing agent for chlorine-containing polymers, the amount of perchlorate in the stabilizing agent is 0.001-5 parts by weight, preferably 0.01-3 parts by weight, and more preferably 0.01-2 parts by weight, based on 100 parts by weight of PVC.

The stabilizing agent of the present disclosure is suitable to be as a stabilizing agent for chlorine-containing polymers. Moreover, the type of the chlorine-containing polymer includes compositions that are unplasticized or free of plasticizers or substantially free of plasticizers, and also include plasticizer-containing compositions.

More specifically, suitable chlorine-containing polymers include: a polymer of vinyl chloride and vinylidene chloride, vinyl resins containing vinyl chloride units in its structure, such as a copolymer of vinyl chloride and fatty acid vinyl esters (particularly vinyl acetate), a copolymer of vinyl chloride with acrylate or methacrylate and acrylonitrile, copolymers of vinyl chloride with a diene compound and with an unsaturated dicarboxylic acid or anhydride thereof, such as a copolymer of vinyl chloride and diethyl maleate, diethyl fumarate, or maleic anhydride, copolymers of a post-chlorinated polymer and vinyl chloride, vinyl chloride and vinylidene chloride with unsaturated aldehydes, ketones and others such as acrolein, crotonaldehyde, vinyl methyl ketone, vinyl methyl ether, and vinyl isobutyl ether; a vinylidene chloride polymer and copolymers thereof with vinyl chloride and other polymerizable compounds; a copolymer of a polymer of vinyl chloroacetate and dichlorodivinyl ether; a chlorinated polymer of vinyl acetate, chlorinated polyesters of acrylic acid and α-substituted acrylic acid; a polymer of chlorinated styrene such as dichlorostyrene; a chlorinated rubber; a chlorinated polymer of ethylene, and a polymer and a post-chlorinated polymer of chloroprene, and copolymers thereof with vinyl chloride, chlorinated natural or synthetic rubbers, and mixtures of the polymers mentioned herein with themselves or other polymerizable compounds.

For the present disclosure, the range of PVC includes PVC homopolymers, polymers of PVC bound with polyacrylate, graft copolymers of PVC with EVA, ABS or MBS, or copolymers of PVC and polymerizable compounds such as acrylonitrile, vinyl acetate or ABS. The copolymer may be a suspension polymer, a bulk polymer or an emulsion polymer.

Other possible polymers of PVC are mixtures of the above homopolymers and copolymers (particularly vinyl chloride homopolymers) and other thermoplastic or/and elastomeric polymers, particularly mixtures blended with acrylonitrile-butadiene-styrene (ABS), MBS, acrylonitrile-butadiene (NBR), styrene-acrylonitrile (SAN), EVA, CPE, MBAS, PMA, PMMA, EPDM or particularly with polylactones selected from the group of ABS, NBR, acrylonitrile-acrylate (NAR), SAN, and ethylene-vinyl acetate (EVA). Other possible polymers are particularly acrylate-based styrene-acrylonitrile copolymers (ASA).

The stabilizing agent of the present disclosure can be directly added to a processing device of a chlorine-containing polymer (for example, a calender, a mixer, a kneader, or an extruder, etc.) in the form of an emulsion, a dispersion (for example, a paste mixture), a master batch, a flake, or a pellet.

The PVC product of the present disclosure can be made in a desired shape by the processing means such as grinding, calendering, extrusion, injection molding, spinning, or extrusion blowing after the stabilizing agent of the present disclosure is added. For example, the resulting PVC product can be a rigid, semi-rigid or flexible PVC product, or used as a plastisol.

The rigid PVC products include hollow products (bottles), packaging film, building materials, PVC pipes, or PVC casings of equipment, and the like.

The semi-rigid or flexible PVC products include cable insulation layers, floor coverings, wall cladding materials, automobile parts, soft films, injection moldings, or hoses, and the like.

Examples of PVC products used as plastisol are artificial leather floor coverings, fabric coatings, wall covering materials, screw coatings, and automobile bottom sealing layers.

The following examples are given to illustrate the contents of the present disclosure and the achievable effects, but the present disclosure is not limited to the examples. The physical properties of the examples are evaluated in the following methods:

Yellowness Index (YI):

It is measured according to ASTM D-1925-70, including measurements at 3 minute intervals.

Transparency of a PVC Sheet:

It is measured according to ASTM D2805-80. The transparency of a PVC sheet is expressed as the value of transparency (%). The higher the value is, the better the transparency is.

Odor of a PVC Leather:

A leather is placed in a 1 L glass container with a cutting area of 10 cm*20 cm, baked in an oven at 80° C. for 2 hours, removed and cooled to 60±5° C., and then sniffed by a qualified smeller (a person trained and certified by the car factory). Low-level values indicate fewer odors.

Examples 1 and 2 and Comparative Examples 1-3

The stabilizing agent is selected according to Table 3 based on 100 parts by weight (hereinafter referred to as parts) of PVC, and added to a dry mixture containing the following components to prepare a PVC product:
100.0 parts of Evipol SH 5730 PVC, K value 57 (from EVC);
5.0 parts of Paralold BTA III N 2 [MBS (methyl mcthacrylatc-butadicne-styrene) modifier (from Rohm & Haas)];
0.5 parts of Paralold K 120 N [acrylate processing aid (from Rohm & Haas)];
0.5 parts of Paralold K 175 [acrylate processing aid (from Rohm & Haas)];
0.3 parts of wax F. [ester wax (fucoidan wax) (from BASF)];
1.0 part of Loxiol G 16 [fatty acid partial ester of glycerol (from Henkel)]; and
3.0 parts of ESO (epoxy soybean oil).

The stabilizing agents of Examples 1 and 2 include 0.6 parts of 30% aqueous sodium perchlorate solution and 0.4 parts in total of alkanolamine and alkanolamide.

The resulting PVC product is rolled on a mixing roll at 180° C. for 5 minutes to form a rolled film, and the YI value of the film is measured according to ASTM D-1925-70. The results are shown in Table 3.

A film test strip of 0.3 mm in thickness is taken from the formed rolled film. The film samples are placed in an oven (Mathis-Thermo-Takter) at 190° C. and subjected to a static thermal test, and the YI value is measured at 3 minute intervals according to ASTM D-1925-70. The results are shown in Table 4.

TABLE 3

| Based on 100 parts by weight of PVC | | Example 1 | Example 2 | Comparative example 1 | Comparative example 2 | Comparative example 3 |
|---|---|---|---|---|---|---|
| Composition of the stabilizing agent | Aqueous sodium perchlorate solution | 0.6 parts | 0.6 parts | 0.6 parts | 0.6 parts | 0.6 parts |
| | Alkanolamine(A)[1] | ν | ν | — | — | — |
| | Alkanolamine(B)[2] | — | — | — | ν | — |
| | Alkanolamide(A)[3] | ν | — | — | — | ν |
| | Alkanolamide(B)[4] | — | ν | — | — | — |
| | Alkanolamine + alkanolamide | 0.4 parts | 0.4 parts | — | 0.4 parts | 0.4 parts |
| | Weight ratio of alkanolamine to alkanolamide in usage amount | 7:3 | 7:3 | — | 1:0 | 0:1 |
| YI value of the rolled film | | 9.05 | 8.73 | 40.17 | 9.49 | 10.35 |

Note:
[1]Alkanolamine(A) is bis (2-hydroxyethyl) oleylamine;
[2]Alkanolamine(B) is triethanolamine (2,2,2-Nitrilotriethanol);
[3]Alkanolamide(A) is N-Bis(2-hydroxyethyl) oleamide; and
[4]Alkanolamide(B) is N,N'-Bis(2-hydroxyethyl) ricinoleamide.

TABLE 4

| | YI value | | | | |
|---|---|---|---|---|---|
| Minute | Example 1 | Example 2 | Comparative example 1 | Comparative example 2 | Comparative example 3 |
| 0 | 8.51 | 7.97 | 58.12 | 9.03 | 11.75 |
| 3 | 11.94 | 11.22 | Terminate | 12.68 | 13.43 |
| 6 | 14.88 | 13.75 | | 15.62 | 17.16 |
| 9 | 20.33 | 19.13 | | 21.72 | 23.51 |
| 12 | 31.46 | 29.66 | | 33.24 | 35.78 |
| 15 | 49.77 | 47.58 | | 51.93 | Terminate |
| 18 | Terminate | 51.11 | | Terminate | |

Since the deterioration of the PVC product is liable to cause yellowing, the results of the YI values of Tables 3 and 4 are compared, showing that the PVC product using a stabilizing agent having a formulation containing alkanolamine and alkanolamide combined with sodium perchlorate in Examples 1 and 2 has a lower YI. That is, the stabilizing agents of Examples 1 and 2 have a good stabilizing effect or a starting color.

Examples 3 and 4 and Comparative Examples 4-6

The stabilizing agent is selected according to Table 5 based on 100 parts by weight (hereinafter referred to as parts) of PVC, and added to a dry mixture containing the following components, and the mixture is pressed to obtain a PVC sheet:
100.0 parts of Evipol SH 7020 PVC, K value 70 (from EVC);
47.0 parts of dioctyl phthalate;
3.0 parts of ESO (epoxy soybean oil);
0.3 parts of Loxiol G 71S [pentaerythritol adipate complex ester lubricant (from Henkel)]; and
0.1 parts of calcium stearate.

The stabilizing agents of Examples 3 and 4 include 0.5 parts of 30% sodium perchlorate butyl diethylene glycol solution and 0.4 parts in total of alkanolamine and alkanolamide.

The resulting PVC sheet is rolled on a mixing roll at 180° C. for 5 minutes to form a rolled film, and a plurality of rolled films are taken and placed in a press for 2 minutes to prepare a PVC sheet of 2 mm in thickness. The YI value of the PVC sheet is measured according to ASTM D-1925-70, and the transparency of the PVC sheet is measured according to ASTM D2805-80. The results are shown in Table 5.

Since the deterioration of the PVC product is liable to cause yellowing, the results of the YI values and the transparency % of Table 5 are compared, showing that the PVC sheet using a stabilizing agent having a formulation containing alkanolamine and alkanolamide combined with sodium perchlorate in Examples 3 and 4 has a lower YI and higher transparency (%). That is, the stabilizing agents of Examples 3 and 4 have a good stabilizing effect and enhance the transparency of the PVC sheet.

Examples 5 and 6 and Comparative Examples 7 and 8

The stabilizing agent is selected according to Table 6 based on 100 parts by weight (hereinafter referred to as parts) of PVC, and added to a dry mixture containing the following components to prepare a PVC leather:
100.0 parts of Evipol SH 5730 PVC, K value 57 (from EVC);
92.0 parts of dioctyl phthalate;
10.0 parts of filler;
2.0 parts of ESO (epoxy soybean oil);
0.2 parts of calcium stearate;
0.5 parts of calcium zinc stabilizing agent
3.0 parts of ESO (epoxy soybean oil); and
0.6 parts of 30% aqueous sodium perchlorate solution.

The stabilizing agents of Examples 5 and 6 include 0.6 parts of 30% aqueous sodium perchlorate solution and 0.4 parts in total of alkanolamine and alkanolamide.

The resulting PVC product is rolled on a mixing roll at 180° C. for 5 minutes to form a rolled film A film test strip of 0.3 mm in thickness is taken from the formed rolled film, bonded to a non-woven fabric, and then is subjected to a foaming and surface treatment procedure, to obtain a PVC leather for testing.

The PVC leather with the cutting area of 10 cm*20 cm is placed in a 1 L glass container, baked in an oven at 80° C. for 2 hours, removed and cooled to 60±5° C., and then sniffed by a qualified smeller to determine the odor of the PVC leather. The results are shown in Table 6.

TABLE 5

| Based on 100 parts by weight of PVC | | Example 3 | Example 4 | Comparative example 4 | Comparative example 5 | Comparative example 6 |
|---|---|---|---|---|---|---|
| Composition of the stabilizing agent | Sodium perchlorate butyl diethylene glycol solution | 0.5 parts | 0.5 parts | 0.5 parts | 0.5 parts | 0.5 parts |
| | Alkanolamine(A) | v | v | — | — | — |
| | Alkanolamine(B) | — | — | — | v | — |
| | Alkanolamide(A) | v | — | — | — | v |
| | Alkanolamide(B) | — | v | — | — | — |
| | Alkanolamine + alkanolamide | 0.4 parts | 0.4 parts | — | 0.4 parts | 0.4 parts |
| | Weight ratio of alkanolamine to alkanolamide in usage amount | 7:3 | 7:3 | — | 1:0 | 0:1 |
| YI value the PVC sheet | | 12.1 | 11.8 | 58.4 | 28.0 | 30.4 |
| Transparency % the PVC sheet | | 98.4 | 98.7 | 90.1 | 73.2 | 92.5 |

TABLE 6

| Based on 100 parts by weight of PVC | | Example 5 | Example 6 | Comparative example 7 | Comparative example 8 |
|---|---|---|---|---|---|
| Composition of the stabilizing agent | Aqueous sodium perchlorate solution | 0.6 parts | 0.6 parts | 0.6 parts | 0.6 parts |
| | Alkanolamine (A) | v | v | — | — |
| | Alkanolamine (B) | — | — | — | v |
| | Alkanolamide (A) | v | — | — | — |
| | Alkanolamide (B) | — | v | — | — |
| | Alkanolamine + alkanolamide | 0.4 parts | 0.4 parts | — | 0.4 parts |
| | Weight ratio of alkanolamine to alkanolamide in the usage amount | 7:3 | 7:3 | — | 1:0 |
| PVC leather odor test | | 3.7 | 3.5 | 4.1 | 3.9 |

The results of the PVC leather odor test of Table 6 are compared, showing that the PVC leather using the stabilizing agent having a formulation containing alkanolamine and alkanolamide combined with sodium perchlorate in Examples 5 and 6 has the effect of lowering the odor of the PVC leather.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A stabilizing agent, comprising the following components in the following amounts based on the total weight of the stabilizing agent, and the sum of the amounts of the components being 100 wt %:
   a) 1-20 wt % of perchlorate with the molecular formula of $M(ClO_4)_n$, wherein M is lithium, sodium, potassium, magnesium, calcium, cesium, barium, zinc, aluminum, lanthanum, cerium, or a hydrotalcite layer-lattice cation; n is 1, 2, or 3, depending on the valence of M; and when M is a hydrotalcite layer-lattice cation, $0<n<1$;
   b) 30-98 wt % of alkanolamine; and
   c) 1-50 wt % of alkanolamide;
   wherein the alkanolamine is alkanolamine of the following formula (I),

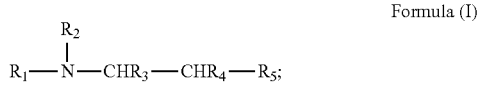

Formula (I)

the alkanolamide is alkanolamide of the following formula (II),

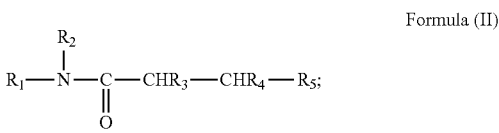

Formula (II)

wherein $R_1$ is H, $C_1$-$C_{22}$ alkyl, $C_2$-$C_{22}$ alkenyl, $C_2$-$C_{22}$ ether, $C_2$-$C_{22}$ ester, $C_2$-$C_{22}$ acylamino, $C_2$-$C_{22}$ hydroxyl, $C_4$-$C_8$ cycloalkyl (which is substituted with OH at β position), $C_6$-$C_{10}$ aryl, or $C_7$-$C_{10}$ alkaryl;
$R_2$ is H, $C_1$-$C_{22}$ alkyl, $C_2$-$C_{22}$ alkenyl, $C_2$-$C_{22}$ ether, $C_2$-$C_{22}$ ester, $C_2$-$C_{22}$ acylamino, $C_2$-$C_{22}$ hydroxyl, $C_4$-$C_8$ cycloalkyl (which is substituted with OH at β position), $C_6$-$C_{10}$ aryl, or $C_7$-$C_{10}$ alkaryl;
$R_3$ is H, $C_1$-$C_{22}$ alkyl, $C_2$-$C_{22}$ alkenyl, $C_6$-$C_{10}$ aryl, or $CH_2$—X—$R_6$, wherein X is O, S, —O—CO—, or —COO—;
$R_4$ is H, $C_1$-$C_{22}$ alkyl, $C_2$-$C_{22}$ alkenyl, $C_6$-$C_{10}$ aryl, or $CH_2$—X—$R_6$, wherein X is O, S, —O—CO—, or —COO—;
$R_5$ is H or OH; and
$R_6$ is H, $C_1$-$C_{22}$ alkyl, $C_2$-$C_{22}$ alkenyl, or $C_6$-$C_{10}$ aryl.

2. The stabilizing agent according to claim 1, wherein the perchlorate has the molecular formula of $NaClO_4$ or $KClO_4$.

3. The stabilizing agent according to claim 1, wherein the perchlorate is zeolite.

4. The stabilizing agent according to claim 1, wherein a weight ratio of the total amount of alkanolamine of formula (I) and alkanolamide of formula (II) to the perchlorate ranges between 4:1 and 99:1.

5. A PVC product, which is prepared by adding the stabilizing agent as claimed in claim 1 into a PVC.

6. The PVC product according to claim 5, wherein the PVC product is a PVC pipe, a PVC sheet, or a PVC leather.

7. The PVC product according to claim 5, wherein the total amount of alkanolamine of formula (I) and alkanolamide of formula (II) is 0.01-10 parts by weight based on 100 parts by weight of PVC.

8. The PVC product according to claim 5, wherein the total amount of alkanolamine of formula (I) and alkanolamide of formula (II) is 0.05 to 5 parts by weight based on 100 parts by weight of PVC.

* * * * *